US008291316B2

(12) United States Patent
Czudak

(10) Patent No.: US 8,291,316 B2
(45) Date of Patent: Oct. 16, 2012

(54) PRODUCTION ENVIRONMENT CRM INFORMATION GATHERING SYSTEM FOR VI APPLICATIONS

(75) Inventor: John C. Czudak, Conesus, NY (US)

(73) Assignee: Xerox Corporation, Norwalk, CT (US)

( * ) Notice: Subject to any disclaimer, the term of this patent is extended or adjusted under 35 U.S.C. 154(b) by 911 days.

(21) Appl. No.: 11/807,790

(22) Filed: May 30, 2007

(65) Prior Publication Data

US 2008/0301549 A1 Dec. 4, 2008

(51) Int. Cl.
G06F 17/00 (2006.01)
(52) U.S. Cl. ................. 715/274; 707/E17.009
(58) Field of Classification Search ............ 715/274
See application file for complete search history.

(56) References Cited

U.S. PATENT DOCUMENTS

| 6,480,841 | B1* | 11/2002 | Higashio et al. ........... 1/1 |
| 7,392,292 | B2* | 6/2008 | Yoon et al. .............. 709/217 |
| 2002/0075505 | A1* | 6/2002 | Murray .................. 358/1.15 |
| 2003/0110256 | A1* | 6/2003 | Yoon et al. .............. 709/224 |
| 2003/0210415 | A1* | 11/2003 | Fabel et al. ............. 358/1.11 |
| 2004/0066527 | A1* | 4/2004 | Kloosterman et al. ..... 358/1.15 |
| 2005/0105803 | A1* | 5/2005 | Ray ...................... 382/209 |
| 2005/0114386 | A1* | 5/2005 | Nassor et al. ............ 707/102 |
| 2005/0169558 | A1* | 8/2005 | Dance et al. ............. 382/305 |
| 2005/0278379 | A1* | 12/2005 | Nakazawa ............... 707/104.1 |
| 2006/0095868 | A1* | 5/2006 | Sawada et al. ........... 715/963 |
| 2006/0167860 | A1* | 7/2006 | Eliashberg et al. ........... 707/3 |
| 2007/0002377 | A1* | 1/2007 | Tokunaga ............... 358/1.18 |
| 2007/0050187 | A1* | 3/2007 | Cox .......................... 704/9 |
| 2007/0067345 | A1* | 3/2007 | Li et al. ................. 707/104.1 |
| 2007/0143661 | A1* | 6/2007 | Machalek .............. 715/503 |
| 2008/0005090 | A1* | 1/2008 | Khan et al. ................ 707/4 |
| 2008/0077555 | A1* | 3/2008 | Miller et al. ................ 707/2 |
| 2008/0244638 | A1* | 10/2008 | Ryden ..................... 725/34 |
| 2008/0288322 | A1* | 11/2008 | Kennedy et al. ........... 705/9 |
| 2010/0238496 | A1* | 9/2010 | Oshima ................ 358/1.15 |

* cited by examiner

Primary Examiner — Laurie Ries
Assistant Examiner — Mustafa Amin
(74) Attorney, Agent, or Firm — Fay Sharpe LLP

(57) ABSTRACT

A system and method for gathering CRM information in a variable imaging application utilize keywords which are associated with each image of a number of digital images. A variable imaging job stream is generated containing one or more of the digital images. Keyword metadata may also be inserted into the variable imaging job stream, and the variable imaging job stream is received by a VI production system. The variable imaging job stream is processed by the VI production system, thereby identifying the keywords previously associated with the contained images, and also extracting the inserted keyword metadata. A CRM output is generated containing the identified keywords and the extracted keyword metadata.

20 Claims, 4 Drawing Sheets

PRODUCTION ENVIRONMENT CRM INFORMATION GATHERING SYSTEM FOR VI APPLICATIONS

BACKGROUND

Customer relationship management (CRM) is used by organizations to manage their relationships with customers, including collecting, storing and analyzing customer information. Customer relationship management can be as simple as knowing a customer's address, however, most CRM systems go beyond that, containing information related to the customer such as, for example, information related to interests, hobbies, income, number of family members, etc. To obtain this information is one reason that many manufacturers and sellers provide questions on registration forms asking for such information. However, this type of data gathering can also be performed in a production system for putting information into a CRM database. For example, when a person utilizes the Internet to view and/or purchase products online, the person may be presented with a number of choices, and the person's selections are delivered to a system for generating an output based on the selections and sending the corresponding material to the purchaser.

In some cases, the web ordering front end is in a position to capture information about the selections and feed it directly into a CRM information gathering system. For example, a selected book might be sports related, e.g., or the topic might be related to golfing, and this information can be stored in the CRM database. This data can then be farmed for delivering targeted advertising via mail, e-mail, etc. Large companies within internet presence such as, e.g., Amazon.com have systems which perform the CRM gathering service. However, CRM gathering systems typically require a large up-front investment for a tailor made CRM system which performs the required information gathering. In many cases, the web ordering system may not be a core part of the business, or may not be a large business, and such a large investment may not be justified. Still, many smaller businesses would benefit from an online presence and would further benefit from being able to capture data related to online purchases such as, e.g., words or terms related to the purchased products. Therefore, there exists a need for an inexpensive and easily implemented method of gathering information related to the purchased products for entering into a separate stand-alone CRM system or for other processing such as, e.g., manual review.

BRIEF DESCRIPTION

A method is provided for gathering CRM information in a variable imaging application. Keywords are associated with each image of a number of digital images, and a VI job stream is generated containing one or more of the digital images. The VI job stream is received and processed by a VI production system. The processing includes identifying the keywords previously associated with each digital image contained in the VI job stream, and generating a CRM output containing the identified keywords.

A second method is also provided for gathering CRM information in a variable imaging application. Keywords are associated with each image of a number of digital images, and a VI job stream is generated containing one or more of the digital images. Keyword metadata is also inserted into the VI job stream, and the VI job stream is received by a VI production system. The VI job stream is processed by the VI production system, thereby identifying the keywords previously associated with the contained images, and also extracting the inserted keyword metadata. A CRM output is generated containing the identified keywords and the extracted keyword metadata.

A VI interpreter system, operating in a VI production system, is also provided. The VI interpreter system includes a CRM processor configured to perform CRM information gathering as follows. For each digital image contained in the VI job stream, keywords previously associated with the contained image are identified, and a CRM output is generated which contains the identified keywords. A raster image processor is configured to produce electronic output document images based on variable imaging jobs included in the received VI job stream. A user interface is provided for receiving instructions from an operator of the VI interpreter and for displaying messages and images to the operator, and a finishing system is configured to produce a final product based on the electronic output document images.

DETAILED DESCRIPTION

Variable information printing (VI printing) is a form of printing in which elements such as text, graphics and images may be changed from one printed piece to the next within a print job, using information previously obtained or currently obtained from a database. For example, a marketing company can prepare a set of personalized letters, each having the same basic layout, but each printed with a different name and address on each letter. Variable information printing is often used for direct marketing, customer relationship management and advertising. Variable information printing also comes into play for companies that have a web ordering presence such as, e.g., Amazon.com and other online retailers.

Figure 1:
FIG. 1 depicts an exemplary packing list for illustrating concepts of the present application.

For example, with reference to FIG. 1, a sporting equipment supply company may have a web presence whereby customers can order online directly from the company. When an order is shipped, the company may prepare and print a packing list related to the order for inclusion in the delivered package. FIG. 1 depicts an exemplary packing list 10 which is shown for illustrating concepts of the present application. The packing list 10 can be printed by an in-house VI printing department, however, information related to the packing list can also be provided to an external VI print provider. Hereinafter, the term "VI production environment" is used in reference to either of an external VI print provider or an in-house VI printing department providing a similar service. Information provided to the VI production environment includes, e.g., a company name and description 12, customer number and order number information 14, customer shipping address 16, and ordered items descriptions 18. Also included with the information provided to the VI production environment, is a graphical logo 20 used by the sporting equipment company.

In the packing list 10 shown in the figure, the company has advantageously included additional marketing information 22 related to items ordered as shown in the item list 18. For example, among the items ordered are a dozen golf balls 24. Taking advantage of the fact that the customer has an apparent interest in golfing, the company has included among the special offers 22, information related to golf shoes 26, polo shirts 28, golf clubs 30, and the golf gloves 32. As shown in the Figure, images 34-40 for the respective items 26-32 have been included in the packing list 10.

According to concepts of the present application, the various content of the VI print job, such as imagery 34-40, while the job is being processed by the VI production environment, can be tracked and, prior to executing the print run for producing the final output, the imagery 34-40 can be tracked and analyzed, and terms can be associated with each of the imagery items. To facilitate the analysis, the images can be reviewed in advance to associate keywords with each image. For example, if the image includes golf equipment or a golfing scene or wording to such effect, it can be associated with sports, golfing, outdoors, etc. These keywords can then be mapped to each image and stored for later use. While the VI print job is being processed, keywords associated with the included images can be collected and later returned to the person or organization which submitted the VI print job to the VI production environment. The keywords can be kept in separate files or databases, or can be included in the image header information as known in the art such as in, e.g., jpeg image header sections. The person or organization creating the image can input the keywords or the keywords can be added or inserted at a later time by a person or automated software analyzing the images. Alternatively, the person or organization providing the images to the production environment, or the customer providing the VI print job request, can provide the keywords. Alternatively again, the VI production environment can determine keywords for the images on the production system as a service to the customer.

It is to be appreciated, that the example shown in the Figure is for exemplary purposes only, and the concepts of the present application can be applied to any form of VI printing as previously described or known in the art.

Figure 2:
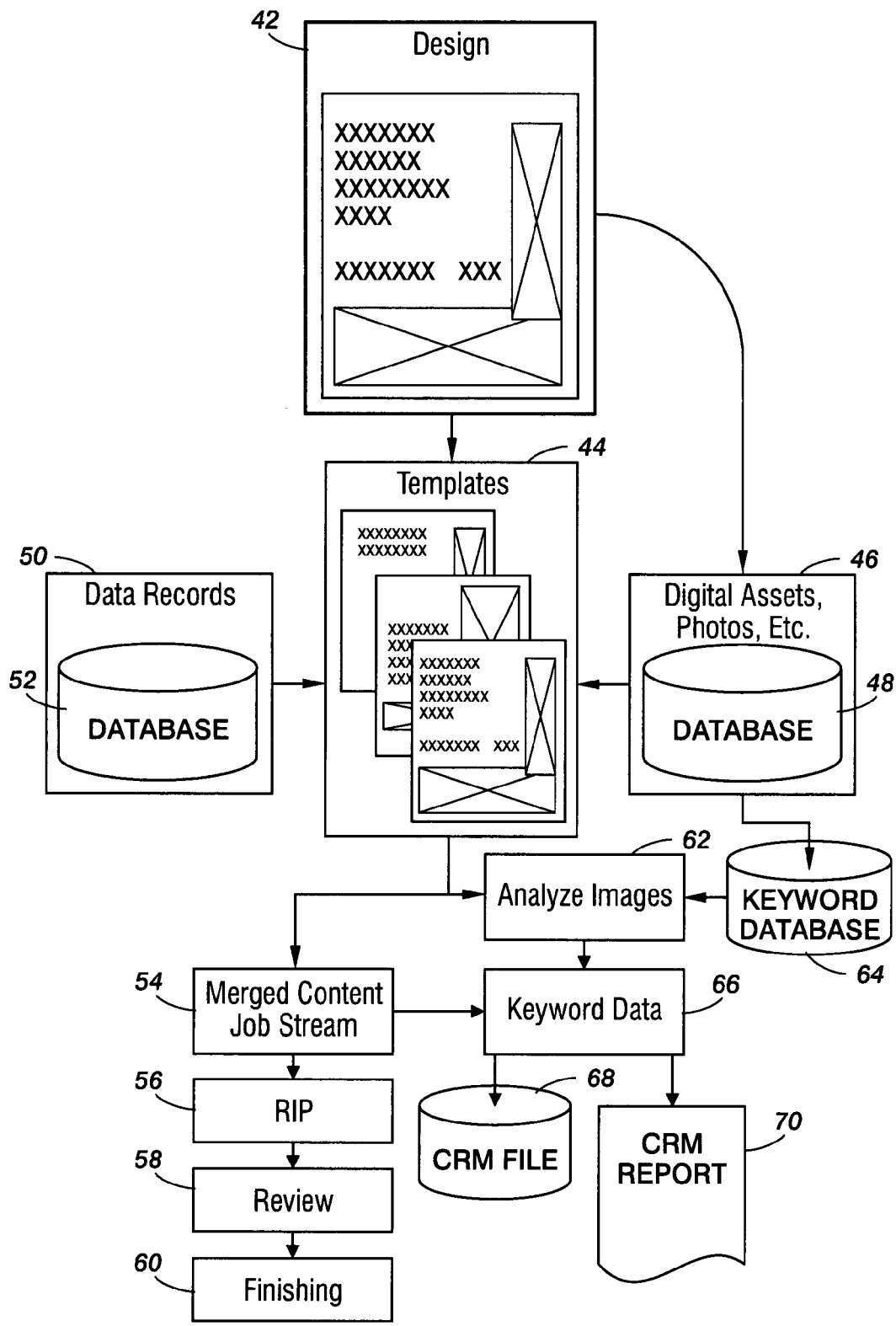
FIG. 2 is a diagram in block form illustrating a variable imaging environment suitable incorporating concepts of the present application for information gathering.

With reference to FIG. 2, a flow diagram is provided in block form for illustrating concepts of the present application. Typically, in a design stage 42, variable information document layouts are designed, and templates 44 are produced representing the designed documents. Additionally, digital assets 46 are created such as, e.g., photos and graphics which are preferably maintained in a digital asset database 48 for further use. Data records 50, as preferably provided in a database 52, containing detailed information pertaining to each variable information document can be merged, based on the templates 44, with the digital assets 46, providing a merged content 54 in a variable information job stream. The VI job stream usually represents a single job having variable documents to print. However, the stream of output from the VI print job may include output to multiple recipients, i.e., a section for each recipient. Further, it is to be understood that, although the various embodiments described herein are described with reference to a print provider providing hardcopy printed product, various other forms of output product such as, e.g., electronic output also fall within the scope of the present application.

The merged content 54 is normally a structured data stream that has elements that allow the production environment to understand that there are multiple sections and where each section starts and ends. Various languages, such as PPML, and VIPP, and others known in the art, will describe this to the production environment. Although these elements can be ignored, the elements are there and can be utilized by the production environment. Thus, the added data elements do not necessarily impact a product environment that does not use or understand the data. The merged content 54 is, however, structured to know recipient boundaries, and it can also provide additional information about each recipient set, e.g., order number, name, keywords, etc.

Keywords are of particular significance in the present application, and it is preferable to associate certain keywords to a recipient, or even with finer granularity, e.g., to a particular order for a recipient. For example, when associating keywords to particular orders, in place of recipient 1, keywords 1, recipient 2, keywords 2, etc., it could be recipient 1, order 1, keywords 1, recipient 2, order 2, keywords 2, etc. It is to be understood that the data used can be used beyond concepts of customer relationship management, e.g., variable information print jobs can be analyzed for reacting to trends, etc. The present application is not limited with respect to how keywords are associated with the merged content or images within the content. For example, keywords associated with an image can be supplied via a manual process, embedded within the image headers included in the merged content, or included in a separate keyword database linked to the included images. It should also be noted that the VI production environment can choose to manage CRM keywords associated to an image by embedding the CRM keywords in the image file regardless of how the CRM keywords for an image are supplied to the production environment.

The merged content 54 is processed by the production environment during which a raster image processing (RIP) 56 is performed to produce electronic output document images, the results of the RIP processing 56 are reviewed 58, and finishing operations 60 are performed on the output document images, providing the end product. Additionally, according to concepts of the present application, the production environment can analyze the images provided in the merged content 54 (62), and based on the analysis of the image, and associated keywords in a keyword database 64, extract keyword data 66. Further, images in the merged content 54, and other data, can contain keywords provided in the merged content 54 which may be extracted and included in the keyword data 66. The keyword data 66 can be provided to the customer providing the merged content 54 in the form of a CRM file or database 68 or a printed CRM report 70.

Figure 3:
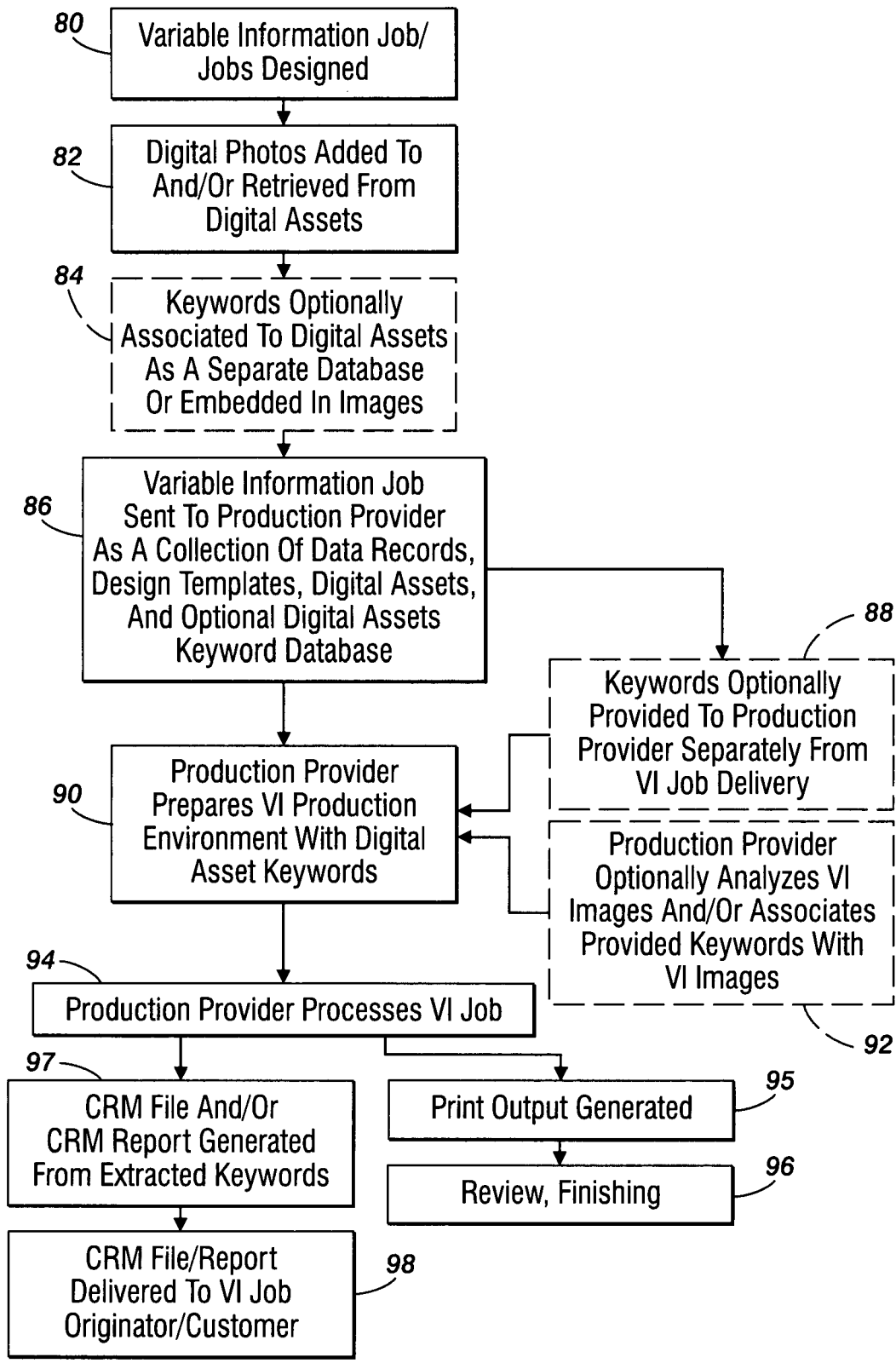
FIG. 3 is a flow chart of a variable imaging and information gathering method according to concepts of the present application.

With reference to FIG. 3, a flow diagram is provided for describing aspects of the present application. As previously described, variable information jobs are designed (80), and digital photos are added to and/or retrieved from digital assets (82). In one embodiment of the present application, keywords are associated to the digital assets as a separate database or embedded in the digital images (84). A Variable information job may be sent to a VI production provider in a VI job delivery step (86) as a collection of data records, design templates, digital assets, and an optional digital assets keyword database. Keywords may also be optionally provided to the VI production provider separately from the VI job delivery (88). The VI production provider now performs, as necessary or desired, initial or preparatory processing to prepare the VI production environment with the digital asset keywords (90). The production provider may also analyze the variable information images and/or associate keywords with the VI images as part of the preparatory processing (92). The VI production provider processes the variable information job (94), thereby generating a printed output in either hardcopy or digital form as known in the art (95) and may further review the output and perform any requested finishing operations on the output as also known in the art (96). However, in addition to the steps of generating a printed output, a CRM file and/or CRM report are generated from the extracted keywords (97), and the CRM file and/or report are then delivered to the VI job originator or customer (98).

Figure 4:
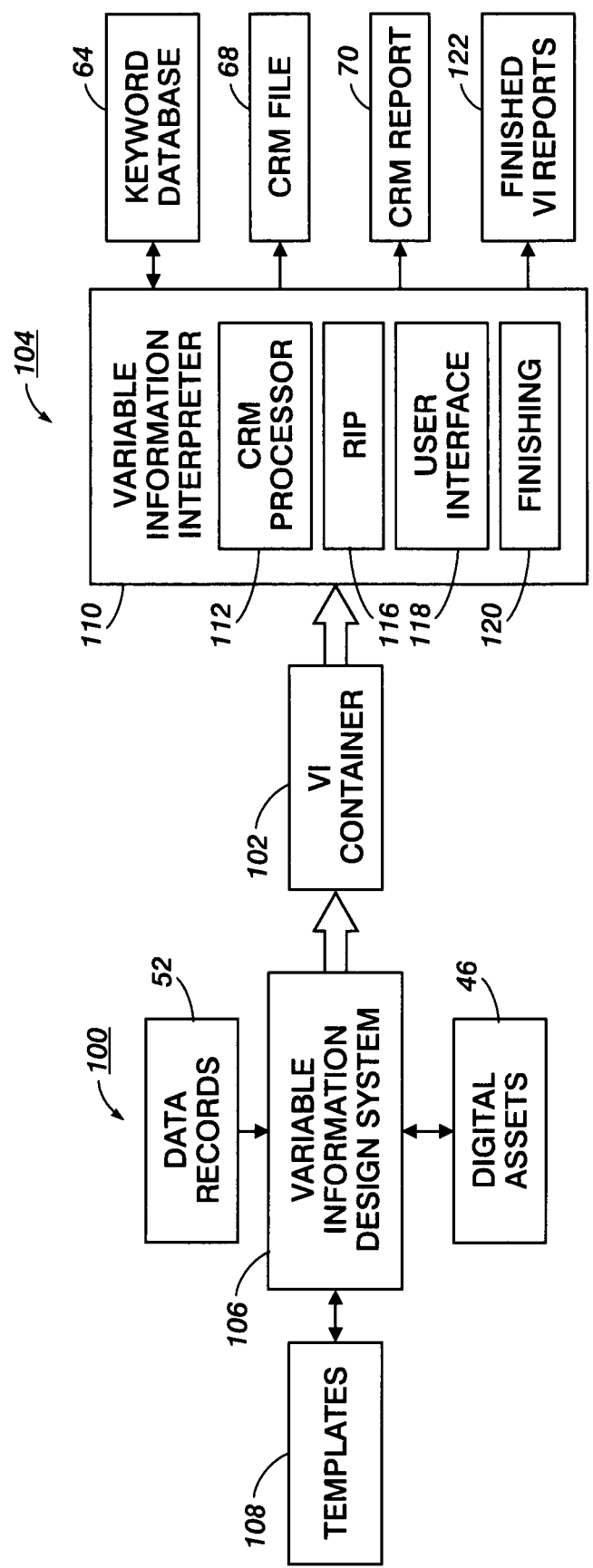
FIG. 4 is a block diagram showing an embodiment of a system incorporating concepts of the present application.

With reference now to FIG. 4 and continuing reference to FIG. 2, a block diagram is provided showing an exemplary system incorporating concepts of the present application, wherein like numerals are used to represent like items. In this exemplary system, a customer system 100 provides a VI container 102 containing the previously described merged content 54 for processing by a VI production environment 104. The customer system 100 includes a VI design system 106 configured to incorporate features of the previously described VI design stage 42. The VI design system 106 utilizes previously designed templates 44 or creates new templates for inclusion with the templates 44 which are preferably stored in a templates database 108. Based on the templates 44, the customer system 100 maintains the digital assets 44 stored in the digital assets database 46 for merging with the data records 50 stored in the data records database 52 to create the merged data content 54 in the VI container 102 as shown in the Figure.

The VI production environment 104 includes a VI interpreter 110 which itself includes a CRM processor 112 which utilizes the previously described keyword database 64 and/or keywords embedded in the received images, or included as metadata in the variable information job, in conjunction with the incoming VI container 102 for producing the CRM file 68 and/or the CRM report 70. The VI interpreter 110 also includes a raster image processor 116, a user interface 118, and a finishing system 120. The raster image processor 116 and the finishing system 120 are configured to perform methods as previously described with reference to the raster image processing 56 and the finishing operations 60 respectively. It is to be understood that each of the systems 116-120 can be included or housed internally as components of the VI interpreter 110 or can be separate systems in operative communication with the VI interpreter 110. The user interface 118 is utilized for interacting with the VI interpreter 110 and also for reviewing VI output before finishing. The VI interpreter 110 also produces the finished VI reports 122 as previously discussed and as known in the art.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for gathering Customer Relationship Management (CRM) information in a variable imaging (VI) application, the method comprising:

providing a digital asset included in a digital asset database;

associating at least one or more keywords with each digital asset in the digital asset database;

merging the digital asset with variable information included in a database using a template for generating a VI print job stream containing at least one digital asset selected from the digital asset database;

receiving the VI job stream by a VI production system;

processing the VI job stream by the VI production system, the processing including:

for each digital image asset contained in the VI job stream, extracting the at least one or more keywords previously associated with the digital asset; and generating a CRM output containing the at least one or more extracted keywords, the at least one or more extracted keywords including marketing information related to the digital asset for associating the merged digital asset with variable information with a recipient; and delivering the CRM output to the requesting user, wherein the marketing information is based on interests of the recipient.

2. The method set forth in claim 1, further comprising:

storing the at least one or more associated keywords in an image header portion of the digital asset, wherein the image header portion includes image metadata, wherein the step of extracting the least one or more keywords previously associated with the digital asset includes extracting the at least one or more stored keyword from the image header portion.

3. The method set forth in claim 1, further comprising:

storing the at least one or more associated keywords as metadata in the VI job stream, wherein the step of identifying the at least one or more keywords previously associated with the digital asset includes extracting the at least one or more keyword metadata from the VI job stream.

4. The method set forth in claim 1, further comprising:

storing the at least one or more associated keywords in a database; and linking each of the plurality of digital asset to the at least one more stored associated keywords, wherein the step of extracting the at least one or more keywords previously associated with the digital asset includes extracting the at least one or more stored associated keywords linked to the digital asset.

5. The method set forth in claim 1, wherein the VI job stream includes variable information for a plurality of entities, the variable information for each of the plurality of entities segregated by entity metadata, the step of generating the CRM output further including:

generating the CRM output for each of the plurality of entities containing the at least one or more extracted keywords for the entity.

6. The method set forth in claim 1, the step of processing the VI job stream further including:

performing a raster image processing of the VI job stream to produce electronic output document images;

reviewing the electronic output document images for accuracy; and performing finishing operations for the output document images.

7. The method set forth in claim 1, the step of processing the VI job stream further including:

sending the generated CRM output to at least one recipient, wherein the CRM output are the at least one more keywords, the at least one or more keywords being related to target information based on the digital asset.

8. A method for gathering Customer Relationship Management (CRM) information in a variable imaging (VI) application, the method comprising:

providing at least one digital image included in a digital asset database;

associating at least one or more keywords with each digital image in the digital asset database, the at least one or more keywords including marketing information associated with the digital image;

receiving, from a requesting user, a template for a VI job stream;

generating the VI job stream, including:

merging the at least one digital image with variable information included in a database using the template;
receiving the VI job stream by a VI production system; and
after the variable digital image is merged in a VI document,
for each digital image inserted into the VI job stream, extracting the at least one or more keywords previously associated with the digital image;
generating a CRM output containing the at least one or more extracted keywords associated with a recipient of the VI document and marketing information is based on interests of the recipient; and
delivering the CRM output to the requesting user.

9. The method set forth in claim 8, further comprising:
storing the at least one or more associated keywords in an image header portion of the digital image, wherein the image header portion of the digital image includes image metadata, wherein the step of extracting the least one or more keywords previously associated with the digital image includes extracting the at least one or more stored keyword from the image header portion.

10. The method set forth in claim 8, further comprising:
storing the at least one or more associated keywords as image metadata in the VI job stream, wherein the step of extracting the at least one or more keywords previously associated with the digital image includes extracting the image metadata from the VI job stream.

11. The method set forth in claim 8, further comprising:
storing the at least one or more associated keywords in a database; and linking each of the plurality of digital images to the at least one or more stored associated keywords, wherein the step of extracting the at least one or more keywords previously associated with the digital image includes extracting the at least one or more stored associated keywords linked to the digital image.

12. The method set forth in claim 8, wherein the VI job stream includes variable information for a plurality of entities, the variable information for each of the plurality of entities segregated by entity metadata, the step of generating the CRM output further including:
generating the CRM output for each of the plurality of entities containing the at least one or more extracted keywords for the entity and a extracted keyword metadata.

13. The method set forth in claim 8, the step of processing the VI job stream further including:
performing a raster image processing of the VI job stream to produce electronic output document images;
reviewing the electronic output document images for accuracy; and
performing finishing operations for the output document images.

14. In a variable imaging (VI) production system receiving a VI job stream, a VI interpreter system comprising:
a Customer Relationship Management (CRM) processor configured to perform CRM information gathering, the CRM information gathering including:
providing at least one digital image included in a digital asset database;
associating at least one or more keywords with each digital image in the digital asset database, the at least one or more keywords including marketing information related to the digital image for associating the at least one digital image with a recipient;
merging the at least one digital image with variable information included in a database using a template to generate a VI job stream;
after the merging and during processing of the VI job stream, extracting, for each digital image contained in the VI job stream, the at least one or more keywords previously associated with the digital image;
generating a CRM output containing the at least one or more extracted keywords; and
delivering the CRM output to a user, wherein the marketing information included in the CRM output is adapted to be used for providing personalized advertising to the recipient;
a raster image processor configured to produce electronic output document images based on a variable imaging job included in the received VI job stream;
a user interface for receiving instructions from an operator of the VI interpreter and for displaying messages and images to the operator; and
a finishing system configured to produce a final product based on the electronic output document images.

15. The VI interpreter system set forth in claim 14, further comprising:
extracting keyword metadata inserted into the VI job stream; and
wherein the step of generating the CRM output includes generating the CRM output containing the at least one or more extracted keywords and the extracted keyword metadata.

16. The VI interpreter system set forth in claim 15, wherein the VI job stream includes variable information for a plurality of entities, the variable information for each of the plurality of entities segregated by entity metadata, the step of generating the CRM output further including:
generating the CRM output for each of the plurality of entities containing the at least one or more extracted keywords for the entity and the extracted keyword metadata.

17. The VI interpreter system set forth in claim 14, wherein the step of extracting the least one or more keywords previously associated with the digital image further includes:
extracting the least one or more associated keywords stored in an image header portion.

18. The VI interpreter system set forth in claim 14, wherein the step of extracting the least one or more keywords previously associated with the contained image further includes:
extracting image metadata from the VI job stream, wherein the least one or more associated keywords were previously stored as image metadata in the VI job stream.

19. The VI interpreter system set forth in claim 14, wherein the step of extracting the least one or more keywords previously associated with the digital image further includes:
extracting previously associated keywords linked to the digital image from a keyword database.

20. The VI interpreter system set forth in claim 14, wherein the VI job stream includes variable information for a plurality of entities, the variable information for each of the plurality of entities segregated by entity metadata, the step of generating the CRM output further including:
generating the CRM output for each of the plurality of entities containing the at least one more extracted keywords for the entity.

* * * * *